(12) United States Patent
Xu et al.

(10) Patent No.: US 11,483,551 B2
(45) Date of Patent: *Oct. 25, 2022

(54) METHOD AND APPARATUS FOR VIDEO CODING

(71) Applicant: TENCENT AMERICA LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,030

(22) Filed: May 10, 2021

(65) Prior Publication Data

US 2021/0266529 A1 Aug. 26, 2021

Related U.S. Application Data

(63) Continuation of application No. 16/393,587, filed on Apr. 24, 2019, now Pat. No. 11,057,617.

(Continued)

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/139* (2014.11); *H04N 19/159* (2014.11); *H04N 19/172* (2014.11); *H04N 19/176* (2014.11)

(58) Field of Classification Search
CPC .. H04N 19/105; H04N 19/139; H04N 19/159; H04N 19/172; H04N 19/176

(Continued)

(56) References Cited

U.S. PATENT DOCUMENTS 6,259,734 B1 7/2001 Boon et al.
8,526,495 B2 9/2013 Liu et al.
(Continued)

FOREIGN PATENT DOCUMENTS

KR 20070086494 A 8/2007

OTHER PUBLICATIONS

Japanese Office Action dated Dec. 14, 2021 in Japanese Patent Application No. 2020-560995 w/English translation, citing documents AX and AY therein, 19 pages.

(Continued)

*Primary Examiner* — Jayanti K Patel
*Assistant Examiner* — Richard B Carter
(74) *Attorney, Agent, or Firm* — ArentFox Schiff LLP

(57) ABSTRACT

Aspects of the disclosure provide a method and an apparatus for video coding. In some examples, the apparatus includes processing circuitry. The processing circuitry decodes prediction information of a current block in a current picture from a coded video bitstream and the prediction information is indicative of inter prediction. The processing circuitry determines, for the current block, motion information including a first motion vector (MV) that has a x component and a y component where each of the x and y components has a fractional MV precision that is $2^{-N}$ of a sample size in the current block and has one of $2^{L+1}$ MV values with the fractional MV precision. N is an integer larger than 2 and L is a positive integer. The processing circuitry reconstructs at least one sample of the current block based on the motion information.

20 Claims, 11 Drawing Sheets

Related U.S. Application Data

(60) Provisional application No. 62/714,546, filed on Aug. 3, 2018.

(51) Int. Cl.
*H04N 19/139* (2014.01)
*H04N 19/172* (2014.01)
*H04N 19/176* (2014.01)
*H04N 19/159* (2014.01)

(58) Field of Classification Search
USPC .................. 375/240.12, 240.03; 382/238
See application file for complete search history.

(56) References Cited

U.S. PATENT DOCUMENTS

| | | | |
|---|---|---|---|
| 8,724,702 | B1 | 5/2014 | Bulusu et al. |
| 9,049,452 | B2 | 6/2015 | Liu et al. |
| 9,510,012 | B2 | 11/2016 | Liu et al. |
| 9,813,726 | B2 | 11/2017 | Liu et al. |
| 9,877,043 | B2 | 1/2018 | He et al. |
| 9,961,358 | B2 | 5/2018 | Liu et al. |
| 10,404,988 | B2 | 9/2019 | Ye et al. |
| 11,057,617 | B2 * | 7/2021 | Xu .................. H04N 19/52 |
| 2005/0013498 | A1 * | 1/2005 | Srinivasan ............ H04N 19/63 382/238 |
| 2008/0101465 | A1 * | 5/2008 | Chono ................ H04N 19/61 375/240.03 |

OTHER PUBLICATIONS

Benjamin Bross et al., High Efficiency Video Coding (HEVC) text specification draft 10 (for FDIS & Last Call), Document: JCTVC-L1003_v34, Joint Collaborative Team on Video Coding (JCT-VC) of ITU-T SG 16 WP 3 and ISO/IEC JTC 1/SC 29/WG 11, 12$^{th}$ Meeting: Geneva, CH, Jan. 14-23, 2013, 16 pages.

Benjamin Bross et al., Versatile Video Coding (Draft 5), Document: JVET-N1001-v2, Joint Video Experts Team (JVET) of ITU-T SG 16 WP 3 and ISO/IEC JTC 1/SC 29/WG 11, 14th Meeting: Geneva, CH, Mar. 19-27, 2019, 20 pages.

"High Efficiency Video Coding", Rec. ITU-T H.265 v4, Dec. 2016.

Xu, et al., "Non-CE2: Intra BC merge mode with default candidates", ISO/IEC JTC1/SC29/WG11 JCTVC-S0123, 2014.

Xu, et al., "CE2: Test 3.2: Intra BC merge mode with default candidates", ISO/IEC JTC1/SC29/WG11 JCTVC-T0073, 2015.

Shan Liu, JongWon Kim and C.-C. Jay Kuo, "Nonlinear motion-compensated interpolation for low-bit-rate video", Applications of Digital Image Processing XXIII, vol. 4115, pp. 203-214, 2000.

Shan Liu, JongWon Kim and C.-C. Jay Kuo, "MCI-embedded motion-compensated prediction for quality enhancement of frame interpolation", Multimedia Systems and Applications III, vol. 4209, pp. 251-262, Mar. 2001.

Shan Liu, JongWon Kim and C.-C. Jay Kuo, "Video Coding via Adaptive Selection of Generalized Motion Prediction Modes", the Picture Coding Symposium 2001, Seoul, Korea, Apr. 25-27, 2001.

Extended European Search Report dated Apr. 7, 2022 in Application No. 19844137.0.

Benjamin Bross et al.: "Versatile Video Coding (Draft 2)", The Joint Video Exploration Team of ISO/IEC JTC1/SC29/WG11 and ITU-T SG.16, No. JVET-K1001, Jul. 18, 2018, pp. 1-139.

Alistair Goudie(IMGTEC): "Restrictions to the maximum motion vector range". 10. JCT-VC Meeting; Jul. 11, 2012-Jul. 20, 2012; Stockholm; (Joint Collaborative Team on Video Coding of ISO/IEC JTEC1/SC29/WG11 and ITU-T SG.16), No. JCTVC-J0225, Jul. 12, 2012, pp. 1-8.

Benjamin Bross et al.: "Versatile Video Coding (Draft 4)", 13. JVET Meeting; Jan. 9, 2019-Jan. 18, 2019; Marrakech (The Joint Video Exploration Team of ISO/IEC JTC1/SC29/WG11 and ITU-T SG.16), No. JVET-M1001, Feb. 26, 2019, pp. 1-267.

Korean Office Action dated Aug. 24, 2022 in Application No. 10-2020-7031137 with English Translation , pp. 1-14.

\* cited by examiner

| | Descriptor |
|---|---|
| mvd_coding( x0, y0, refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater1_flag[ 0 ] ) { | |
|     abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

*FIG. 9*

METHOD AND APPARATUS FOR VIDEO CODING

CROSS REFERENCE TO RELATED APPLICATIONS

The present application is a continuation of U.S. application Ser. No. 16/393,587, filed on Apr. 24, 2019, which claims the benefit of priority to U.S. Provisional Application No. 62/714,546, "Motion Vector Range Constraints" filed on Aug. 3, 2018, the contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes prediction information of a current block in a current picture from a coded video bitstream and the prediction information is indicative of inter prediction. The processing circuitry determines, for the current block, motion information including a first motion vector (MV) that has a x component and a y component where each of the x and y components has a fractional MV precision that is $2^{-N}$ of a sample size in the current block and has one of $2^{L+1}$ MV values with the fractional MV precision. N is an integer larger than 2 and L is a positive integer. The processing circuitry reconstructs at least one sample of the current block based on the motion information.

In an embodiment, each of the x and y components of the first MV is represented by (L+1) bits including L bits for magnitude and 1 bit for direction, and the $2^{L+1}$ MV values are within a MV range of $[-2^L, 2^L-1]$.

In an embodiment, the processing circuitry stores the motion information in a memory space. A size of the memory space is at least J bits reserved for the first MV and a second MV, a first reference index, a second reference index, and an indicator for an inter prediction direction. Each of x and y components of the second MV is represented by (L+1) bits, the first reference index is represented by K bits and indicates a first reference picture in a first reference list associated with the first MV, the second reference index is represented by K bits and indicates a second reference picture in a second reference list associated with the second MV, and the indicator is represented by I bits. The inter prediction direction is one of: a forward uni-directional prediction associated with the first MV and the first reference picture, a backward uni-directional prediction associated with the second MV and the second reference picture, and a bi-directional prediction associated with the first and second MVs and the first and second reference pictures. K is a positive integer, I is one of: 0 and 2, and J is equal to (4(L+1)+2K+I).

In an example, L is 17, N is 4, K is 4, I is 2, and J bits reserved for the memory space are 82, and 18 bits are used for each of the x and y components of the first and second MVs.

In an example, L is 18, N is 4, K is 4, and I is 2. Accordingly, 19 bits are used for each of the x and y components of the first and second MVs, 4 bits are used for each of the first and second reference indices, 2 bits are used for the indicator, and J bits reserved for the memory space are 86.

In an example, L is 18, N is 4, K is 5, and I is 0. In an example, L is 19, N is 4, K is 4, and I is 2. In an example, L is 22, N is 4, K is 4, and I is 2. In an example, L is 22, N is 4, K is 5, and I is 0. In an example, L is 23, N is 5, K is 4, and I is 2.

In an embodiment, the motion information further includes the second MV, the first reference index, the second reference index, and the indicator that indicates the bi-directional prediction.

In an embodiment, the processing circuitry determines the x and y components of the first MV based on corresponding x and y components of a MV predictor and a MV difference, respectively. In an example, the prediction information indicates a merge mode for the inter prediction. The processing circuitry determines the x and y components based on the corresponding x and y components of the MV predictor without the MV difference.

In an embodiment, the motion information further includes a first reference index indicating a first reference picture in a first reference list associated with the first MV. The processing circuitry obtains an initial MV for the current block from a temporal candidate of the current block, a first temporal distance is between the first reference picture and the current picture, and a second temporal distance is between a third reference picture of the temporal candidate and the current picture. The processing circuitry scales, based on the first and second temporal distances, x and y components of the initial MV to obtain the x and y components of the first MV, respectively. For each of the x and y components of the first MV, when the respective component is outside the MV range of $[-2^L, 2^L-1]$, the processing circuitry clips the respective component to be within the MV range of $[-2^L, 2^L-1]$.

In an embodiment, an integer MV range having an integer MV precision is $[-2^M, 2^M-1]$ and corresponds to the MV range, $2^N$ of the $2^L+1$ MV values in the MV range correspond to one of $2^M+1$ MV values in the integer MV range where the integer MV precision is the sample size and M is (L−N).

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 illustrates exemplary syntax for MVD binarization according to an embodiment of the disclosure.

DETAILED DESCRIPTION OF EMBODIMENTS

Figure 1:
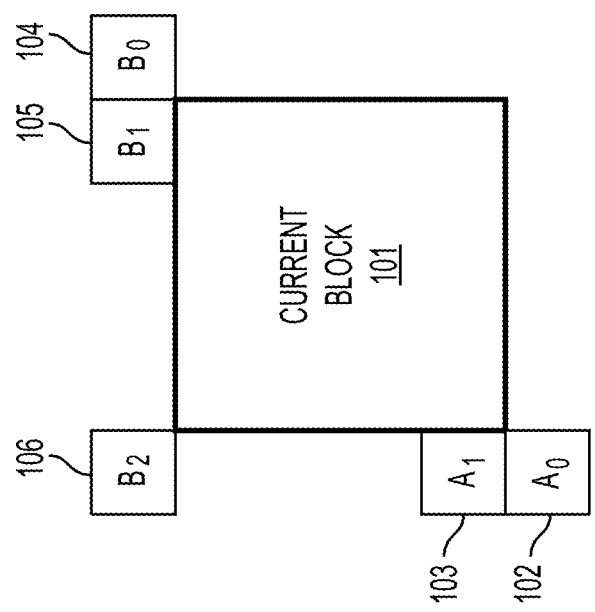
FIG. 1 is a schematic illustration of a current block and its surrounding spatial merge candidates in one example.
Figure 2:
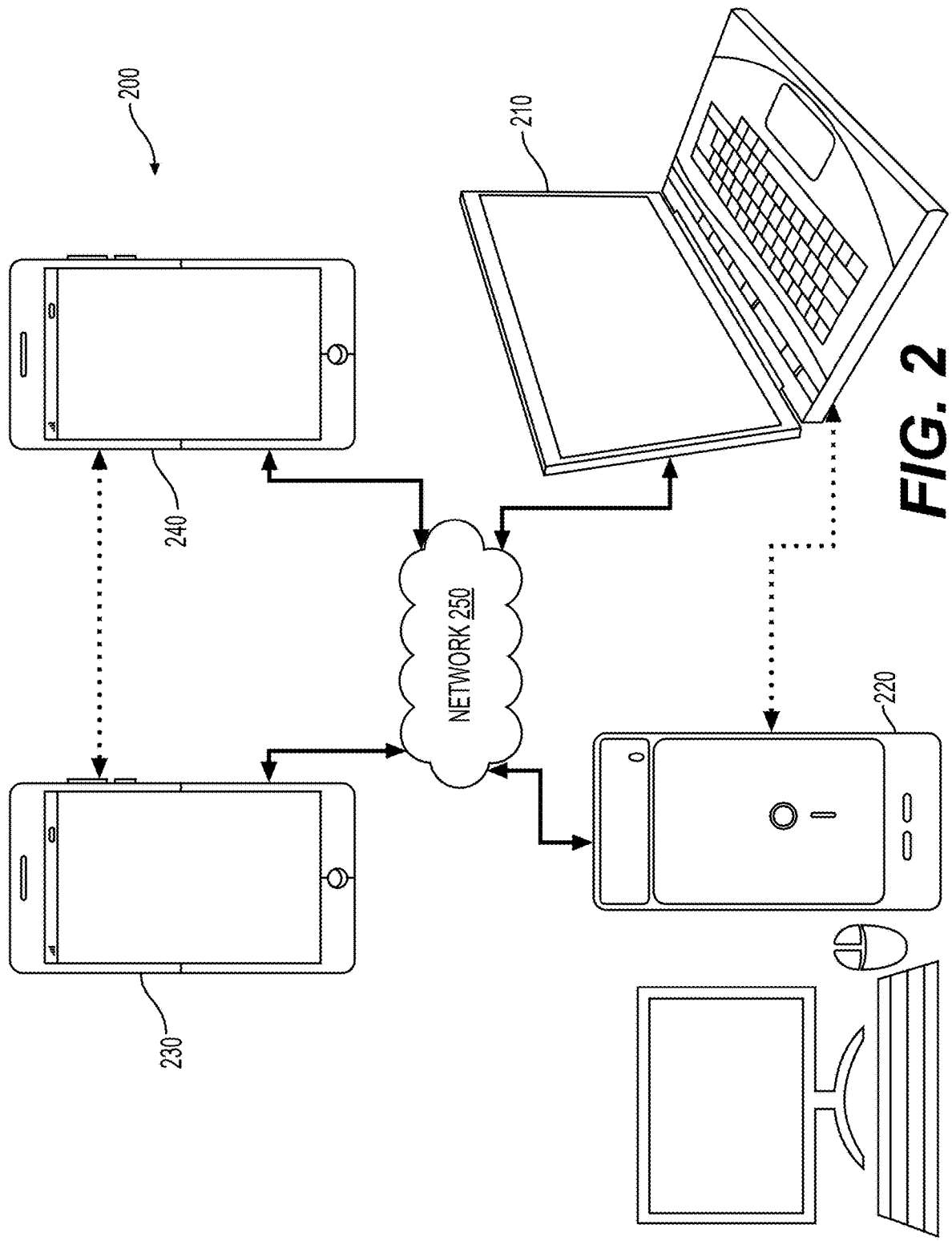
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
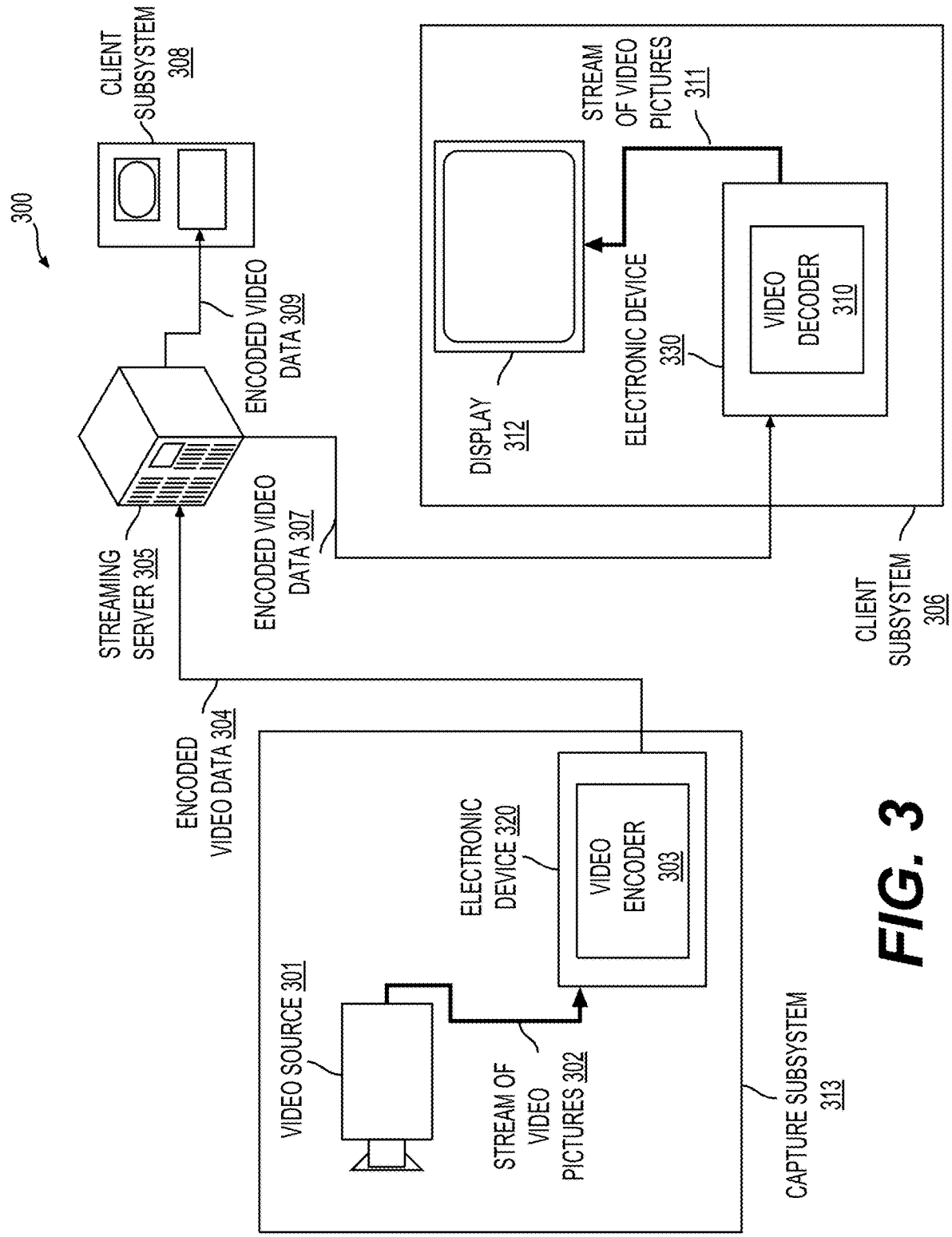
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
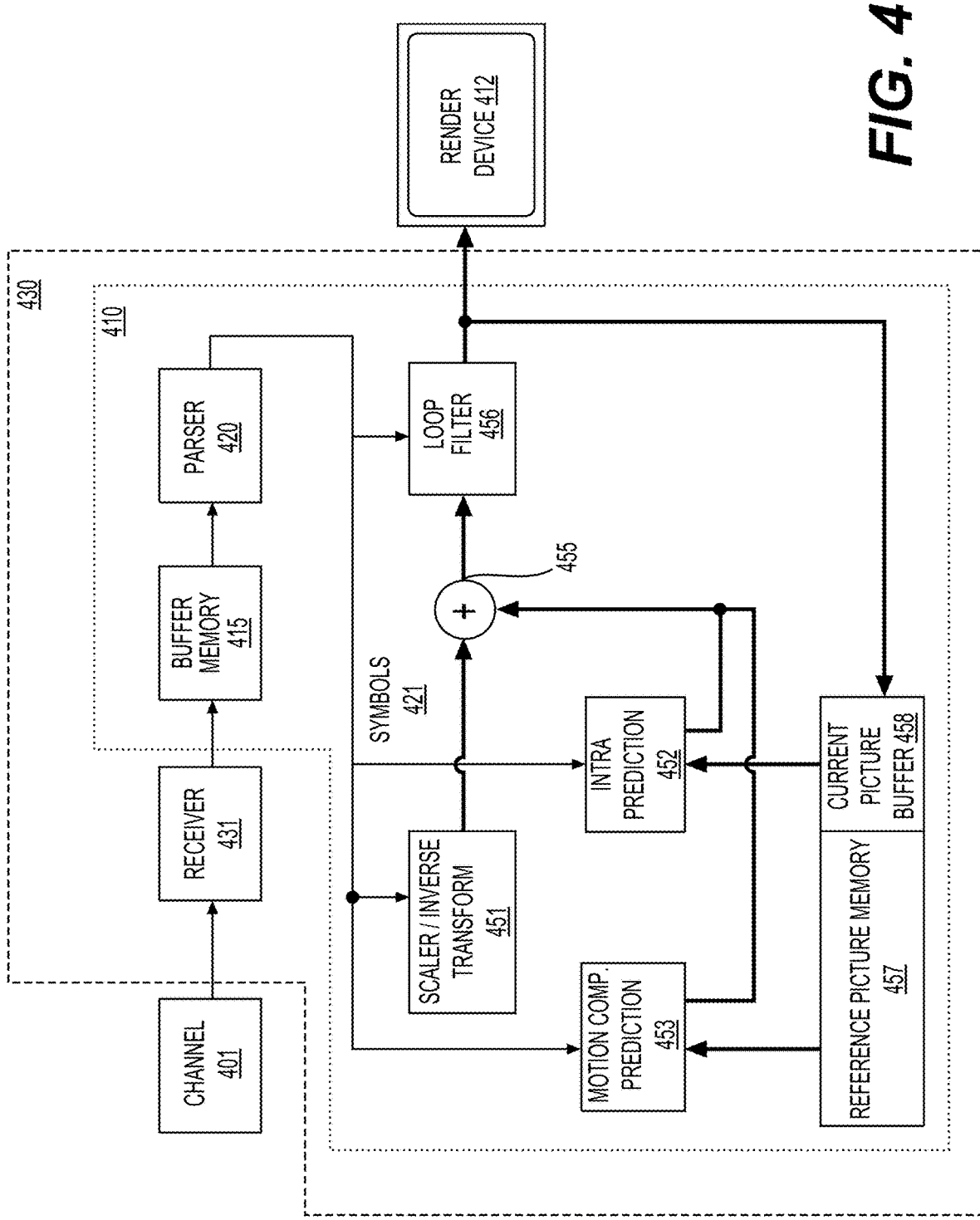
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
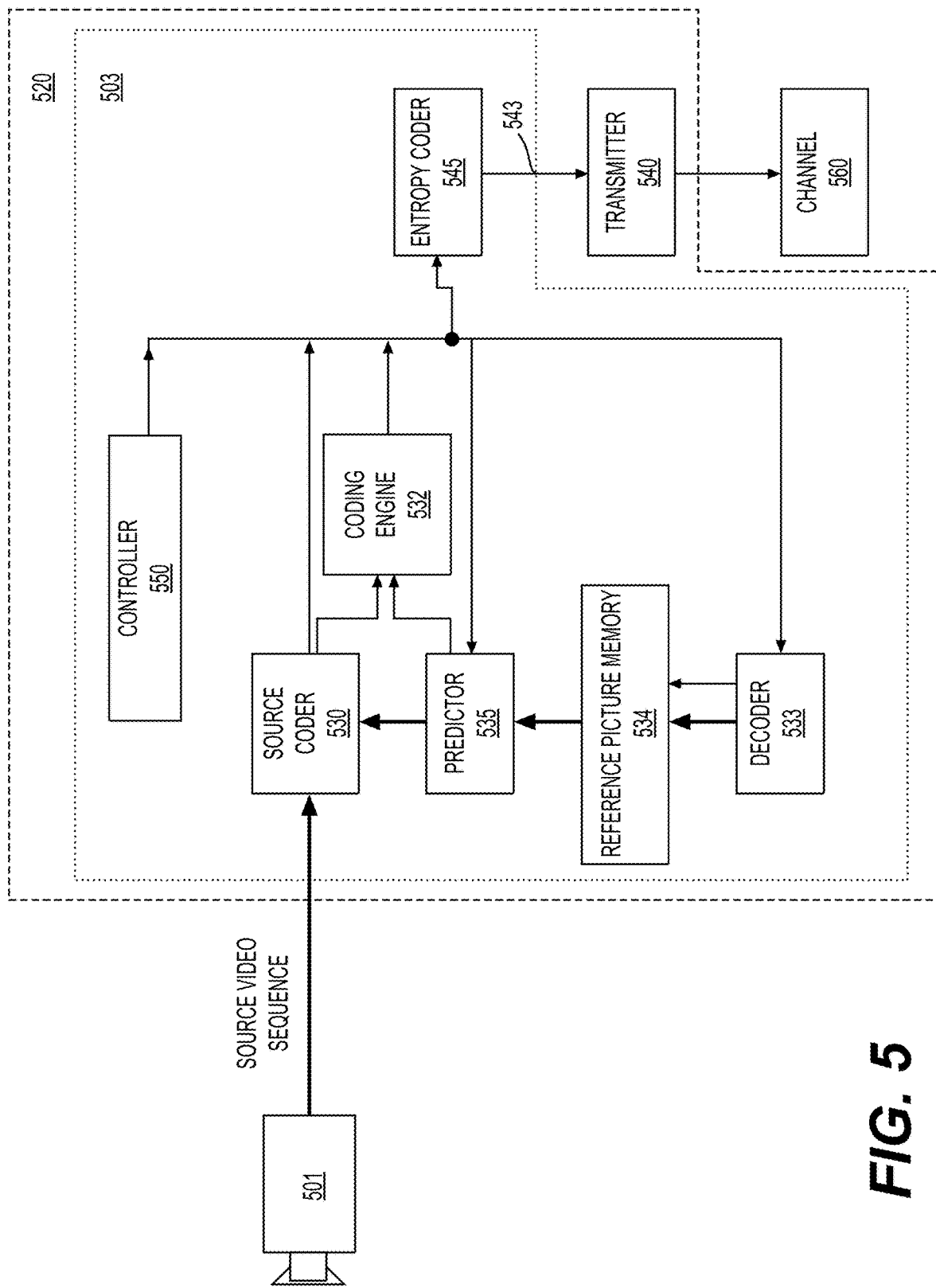
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
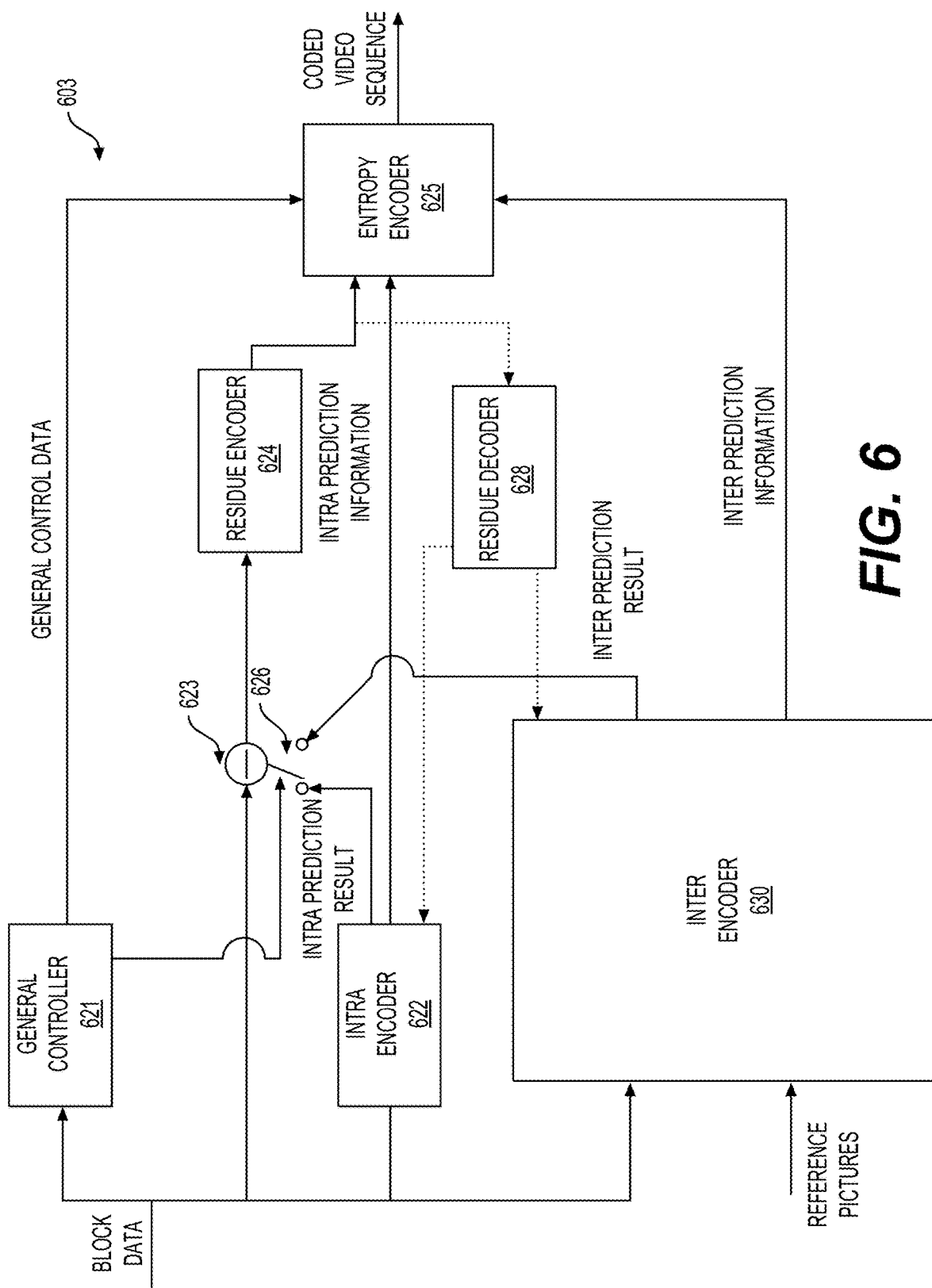
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
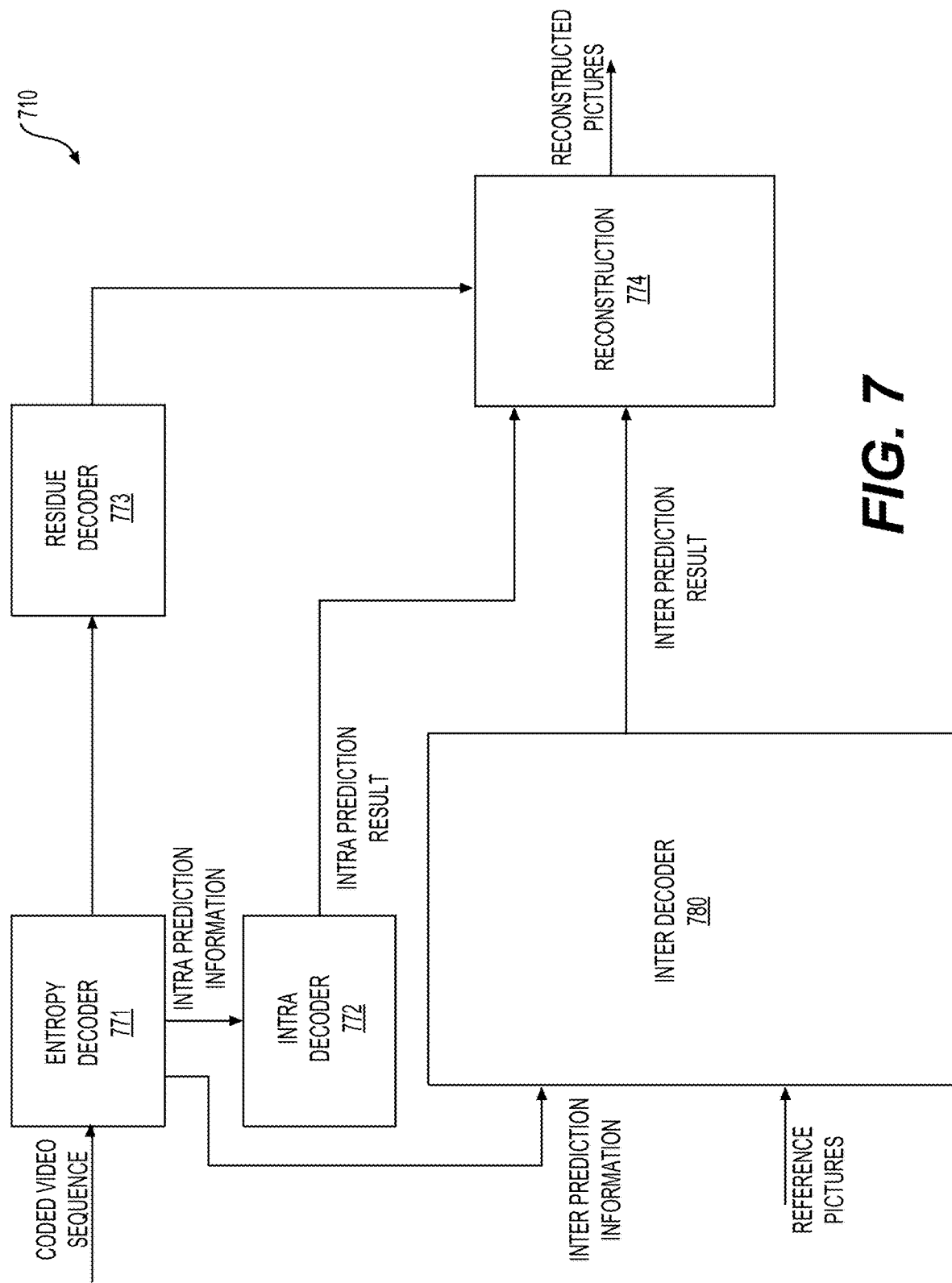
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

According to some embodiments, a MV for a current block can be coded either in an explicit way, to signal a difference between a MV predictor and the MV, or in an implicit way, to be indicated as derived from one previously coded or generated MV. Alternatively, a MV pair can be coded either in the explicit or implicit way when a bi-directional prediction is used. The explicit coding of a MV can be referred to as an Advanced Motion Vector Prediction (AMVP) or a residue mode. The implicit coding of a MV may be referred to as a merge mode (or an inter merge mode), in which the current block is merged into a previously coded block by sharing motion information of the previously coded block.

Figure 8:
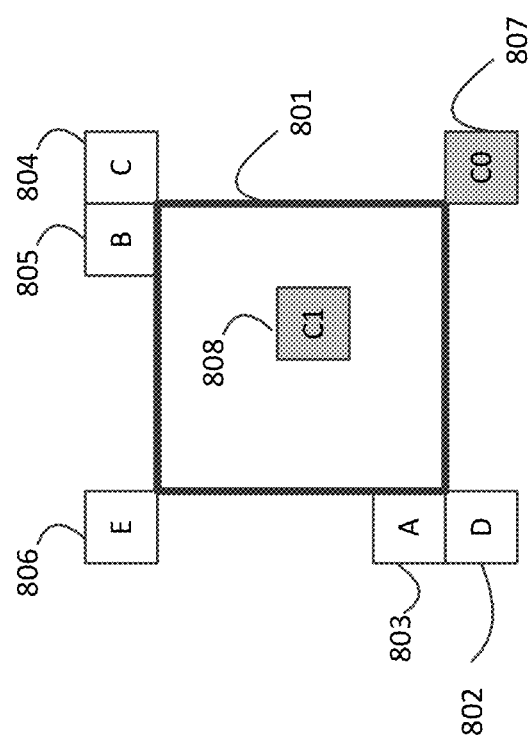
FIG. 8 shows examples for spatial and temporal candidates for a current block according to some embodiments of the disclosure.

In the merge mode, merge candidates may be formed based on motion information from either spatial or temporal neighboring blocks of a current block. Referring to FIG. 8, examples of spatial and temporal merge candidates (or positions for the spatial and temporal merge candidates) are shown for a current block (801) in a current picture according to some embodiments of the disclosure. The current block (801) can be coded in the merge mode. The positions include A (803), B (805), C (804), D (802), and E (806). For purposes of brevity, the spatial merge candidates associated with the positions A (803), B (805), C (804), D (802), and E (806) can also be referred to using the respective positions. The spatial merge candidates may be sequentially checked into a merge candidate list. In an example, for each of the spatial merge candidates, availability of the respective spatial merge candidate is checked according to an order, such as {A, B, C, D, E} or another ordering. For example, if a spatial neighboring block located at the checked position is intra predicted, is outside the current picture, a current slice, a current tile, or the like, the corresponding spatial merge candidate is considered to be unavailable. A pruning operation can be performed to remove one or more duplicated spatial merge candidates from the merge candidate list.

In some embodiments, after including spatial merge candidates into the merge candidate list, one or more temporal merge candidates are checked into the merge candidate list. For example, a collocated block of the current block is identified in a specified reference picture. Referring to FIG. 8, the collocated block in the specified reference picture of the current block (801) can have the same position coordinates (e.g., x and y coordinates) as the current block (801). A temporal merge candidate can be from a temporal neighboring block at a C0 position (807) of the collocated block. A top left corner of the temporal neighboring block at the C0 position (807) can be an outer bottom right corner of the current block (801). In an embodiment, the top left corner of the temporal neighboring block at the C0 position (807) does not overlap with a bottom right corner of the current block (801). For example, the bottom right corner of the current block (801) is located at a position (x, y), and thus, the top left corner of the temporal neighboring block at the C0 position (807) is located at a position (x+1, y+1) that is the outer bottom right corner of the current block (801). If the temporal neighboring block at the C0 position (807) is not coded in an inter mode or is not available, a temporal merge candidate can be from a temporal neighboring block at a C1 position (808) of the collocated block. The temporal neighboring block at the C1 position (808) can be collocated near or at a center position of the current block (801). When 2w and 2h are the width and height of the current block (801), respectively, and a top left corner of the current block (801) is at a position (0, 0), the center position of the current block (801) can be located at a position (w, h), a position (w−1, h), a position (w, h−1), or a position (w−1, h−1). In an example, a top left corner of the temporal neighboring block at the C1 position (808) is collocated at the center position (w, h) of the current block (801). Particularly, the temporal neighboring block at the position C1 (808) may be a sub-block of the collocated block in the reference picture. According to some embodiments, additional merge candidates in the merge candidate list can include combined bi-predictive candidates and/or zero motion vector candidates.

An AMVP mode can use motion information, such as a MV, of spatial and temporal neighboring blocks to predict motion information, such as a MV predictor, of a current block, while motion prediction residue is further coded. FIG. 8 also illustrates examples of spatial and temporal candidate predictors for the AMVP mode. For purposes of brevity, a temporal candidate predictor used in an AMVP mode and a temporal merge candidate used in a merge mode can be referred to as a temporal candidate. Similarly, a spatial candidate predictor used in an AMVP mode and a spatial merge candidate used in a merge mode can be referred to as a spatial candidate. In an example of the AMVP mode, a two-candidate MV predictor list is formed. However, the MV predictor list can include different numbers of candidates in other embodiments. A first candidate predictor is from a first available MV from a left edge (or side) of the current block (801) in an order of the positions D and A, respectively. A second candidate predictor is from a first available MV from a top edge (or side) of the current block (801), in an order of the positions C, B, and E, respectively. If no valid MV can be identified from the checked positions for either the left edge or the top edge, no spatial candidate predictor from the left and top edges can be filled in the two-candidate MV predictor list. In an example, if the first candidate predictor and the second candidate predictor are identical, only one of the first and second candidate predictors is kept in the two-candidate MV predictor list.

If the two-candidate MV predictor list is not full with two different candidate predictors, a MV of a temporal collocated block at the C0 location (807) in the reference picture is used as another candidate predictor. If the MV for the C0 position (807) is not available, a MV for the C1 position (808) in the reference picture can be used. In an example, the MV for the C0 position (807) and the MV for the C1 position (808) can be scaled before being included in the two-candidate MV predictor list. If, after checking the spatial and temporal candidates A, B, C, D, E, C0, and C1, respectively, there are still not enough candidate predictors in the two-candidate MV predictor list, a zero MV can be used to fill up the two-candidate MV predictor list.

According to some embodiments, in an AMVP mode, after a MV is predicted by a MV predictor from the two-candidate MV predictor list, a residue part is referred to as a MV difference (MVD), which can have x and y components. The MVD is a difference between the MV and the MV predictor. Coding of the MVD can involve (i) a binarization of a difference value in each component of the MVD and/or (ii) context modeling for certain binarized bins.

In a bi-directional predicted slice (also referred to as a B_slice), each block can be coded in one of: a forward uni-directional prediction (i.e., predicted from a first reference picture in a first reference list 0 or L0), a backward uni-directional prediction (i.e., predicted from a second reference picture in a second reference list 1 or L1), and a bi-directional prediction (i.e., predicted from the first and second reference pictures). The forward and backward uni-directional predictions can be referred to as a uni-directional prediction. In some embodiments, when the bi-directional prediction is used in a coded block, two MVs associated with the first and second reference pictures, respectively, are used. Further, two MVDs associated with the two MVs can be coded. The two MVDs can be coded independently, for example, according to any suitable video coding standards.

FIG. 9 illustrates exemplary syntax for MVD binarization according to an embodiment of the disclosure. The MVD binarization syntax shown in FIG. 9 can be used in the HEVC standard.

In some embodiments, for MVs used in a coding process, such as a decoding process, a MV range constraint is applied as described below. A MV for a current block can have an x component and a y component. In an embodiment, each of the x and y components has a fractional MV precision, such as ¼ of a sample size in the current block. The ¼ fractional MV precision is also referred to as a quarter-pixel (pel) precision. When 16 bits, including 1 bit for direction (or sign), are used to specify the MV, each of the x and y components is in a MV range of $[-2^{15}, 2^{15}-1]$. The MV range has the fractional MV precision that is a ¼ of the sample size, and can also be referred to as the fractional MV range. The MV range includes $2^{16}$ integer MV values ranging from $-2^{15}$ to $2^{15}-1$ with an increment of 1. Alternatively, each of the x and y components can have an integer MV precision, such as 1 of the sample size in the current block, and thus, each of the x and y components is in an integer MV range of $[-2^{13}, 2^{13}-1]$. The integer MV range includes $2^{14}$ integer MV values ranging from $-2^{13}$ to $2^{13}-1$ with an increment of 1. Therefore, when the MV range constraint is applied to the MV, each component of the MV is within a certain range, such as the MV range of $[-2^{15}, 2^{15}-1]$ with the fractional MV precision or the integer MV range of $[-2^{13}, 2^{13}-1]$ with the integer MV precision.

In an embodiment, a current block to be coded can be a luma PB in a slice of a current picture. A reference picture for the slice is in a reference picture list LX and is indicated by a reference index refIdx of the slice where X is either 0 or 1. Accordingly, the reference picture can be in the first reference list L0 or in the second reference list L1.

In an example, when a first flag predFlagLX is equal to 1, the reference picture is not the current picture, and a second flag use_integer_mv_flag is equal to 0, a luma MV for the current block can be derived as follows:

$$uLX[0]=(mvpLX[0]+mvdLX[0]+2^{16})\% \ 2^{16} \quad (1)$$

$$mvLX[0]=(uLX[0]>=2^{15})?(uLX[0]-2^{16}):uLX[0] \quad (2)$$

$$uLX[1]=(mvpLX[1]+mvdLX[1]+2^{16})\% \ 2^{16} \quad (3)$$

$$mvLX[1]=(uLX[1]>=2^{15})?(uLX[1]-2^{16}):uLX[1] \quad (4)$$

where the second flag being 0 indicates that the fractional MV precision is used for a MVD associated with the luma MV. In the example, 16 bits are used to specify each of x and y components of the luma MV, a MV predictor associated with the luma MV and the MVD.

As described above, X is either 0 or 1. When the luma MV is associated with the first reference picture in the first reference list 0, X is 0. When the luma MV is associated with the second reference picture in the second reference list 1, X is 1. Eqs. (1) and (2) show an example to derive the x component, mvLX[0], of the luma MV (i.e., mvLX). In an example, the AMVP mode is used, and the luma MV can be a sum of a MV predictor (i.e., mvpLX) and a MVD (i.e., mvdLX). Accordingly, a sum of an x component mvpLX[0] of the MV predictor and an x component mvdLX[0] of the MVD is obtained, and the sum is adjusted to be within a range of $[0, 2^{16}-1]$, as described in Eq. (1). Subsequently, in Eq. (2), the x component mvLX[0] of the luma MV is obtained by shifting the adjusted sum uLX[0] to be within the MV range of $[-2^{15}, 2^{15}-1]$. Similarly, Eqs. (3) and (4) show an example to derive the y component, mvLX[1], of the luma MV.

In another example, when the first flag predFlagLX is equal to 1, the reference picture is not the current picture, and the second flag use_integer_mv_flag is equal to 1, the luma MV for the current block can be derived as follows:

$$uLX[0]=((((mvpLX[0]>>2)+mvdLX[0])<<2)+2^{16})\% \ 2^{16} \quad (5)$$

$$mvLX[0]=(uLX[0]>=2^{15})?(uLX[0]-2^{16}):uLX[0] \quad (6)$$

$$uLX[1]=((((mvpLX[1]>>2)+mvdLX[1])<<2)+2^{16})\% \ 2^{16} \quad (7)$$

$$mvLX[1]=(uLX[1]>=2^{15})?(uLX[1]-2^{16}):uLX[1] \quad (8)$$

where the second flag being 1 indicates that an integer MV precision is used for the MVD. In the example, 16 bits are used to specify each of the x and y components of the luma MV and the MV predictor that have the quarter-pel precision, and 14 bits are used to specify each of the x and y components of the MVD that has the integer MV precision.

Eqs. (5) and (6) show an example to derive the x component mvLX[0] of the luma MV. In particular, in Eq. (5), the x component mvpLX[0] of the MV predictor is adjusted from the quarter-pel precision to the integer MV precision by dividing the x component of the MV predictor by 4, for example, by shifting the 16 bits used to represent the x component of the MV predictor by 2 bits. A sum of the adjusted x component mvpLX[0] of the MV predictor and the x component mvdLX[0] of the MVD is obtained, and the sum is adjusted to be within a range of $[0, 2^{16}-1]$. In Eq. (6), the x component mvLX[0] of the luma MV is obtained by shifting the adjusted sum uLX[0] to be within the MV range of $[-2^{15}, 2^{15}-1]$. Similarly, Eqs. (7) and (8) show an example to derive the y component mvLX[1] of the luma MV.

Calculations similar to those described with reference to Eqs. (5)-(8) can be performed for block vectors used in intra block copy when the reference picture is the current picture.

When the luma MV described above is from a temporal candidate of the current block, the luma MV can be scaled and the scaled luma MV can be adjusted to be bound by the same MV range constraint. For example, each component of the adjusted luma MV is within the same MV range or within the integer MV range. In an embodiment, a reference picture of the current picture is different from a reference picture of the temporal candidate. In an example, the reference picture of the current picture is the first reference picture in the first reference list L0 and is indicated by a first reference index, and the reference picture of the temporal candidate is referred to as a third reference picture. Therefore, a first temporal distance tb is between the first reference picture and the current picture and a second temporal distance td is between the third reference picture and the current picture. When the first temporal distance and the second temporal distance satisfy a condition, the x and y components of the luma MV derived from the temporal candidate can be scaled based on the first temporal distance tb and the second temporal distance td. For example, the condition can include at least one of: the first temporal distance tb and the second temporal distance td are smaller than a threshold, the first reference picture and the third reference picture are short-term reference pictures, and the like. The scaled luma MV can be further adjusted to be bound by the same MV range constraint, as described above. In an example, when a component of the scaled luma MV is outside the MV range constraint, the component of the scaled luma MV is clipped to be within the MV range constraint, such as shown below.

In an example, a flag availableFlagLXA is equal to 1, the first reference picture of the current picture is different from the third reference picture, and the first reference picture and the third reference picture are short-term reference pictures, accordingly, the luma MV can be scaled and further adjusted such that each component of the adjusted MV is within the MV range of $[-2^{15}, 2^{15}-1]$, as shown below using Eqs. (9)-(13). In an example, when a component of the scaled luma MV is outside the MV range of $[-2^{15}, 2^{15}-1]$, the component of the scaled luma MV is clipped to be within the MV range of $[-2^{15}, 2^{15}-1]$, such as shown in Eq. (11).

$$tx=(16384+(Abs(td)>>1))/td \quad (9)$$

$$distScaleFactor=Clip3(-4096,4095,(tb*tx+32)>>6) \quad (10)$$

$$mvLXA=Clip3(-32768,32767,Sign(distScaleFactor*mvLXA)*((Abs(distScaleFactor*mvLXA)+127)>>8)) \quad (11)$$

$$tb=Clip3(-128,127,DiffPicOrderCnt(currPic,RefPicListX[refIdxLX])) \quad (12)$$

$$td=Clip3(-128,127,DiffPicOrderCnt(currPic,RefPicListA[refIdxLA])) \quad (13)$$

The first and second temporal distances can be obtained using Eqs. (12) and (13). A scaling factor (i.e., distScaleFactor) can be obtained based on the first and second temporal distances using Eqs. (9) and (10). More specifically, in Eq. (12), a function DiffPicOrderCnt calculates a first Picture Order Count (POC) difference between the first reference picture and the current picture, and the first POC difference represents the first temporal distance tb. Similarly, the function DiffPicOrderCnt in Eq. (13) calculates a second POC difference between the third reference picture and the current picture, and the second POC difference represents the second temporal distance td. When the first reference picture is used, X in Eq. (12) is 0, and refIdxLX is refIdxL0, representing the first reference index, RefPicListX is RefPicList0, representing the first reference list 0. CurrPic represents the current picture. When the reference picture of the current block is the second reference picture, the descriptions above can be suitably adapted, for example, by setting X to 1. In Eq. (11), the luma MV is scaled based on the scaling factor distScaleFactor and further adjusted to be within the MV range of $[-2^{15}, 2^{15}-1]$.

The descriptions above with reference to Eqs. (1) to (13) can be suitably adapted to determine various MVs, such as a chroma MV associated with a chroma PB. Alternatively, in some examples, a luma MV of a luma PB can be obtained, and subsequently, a chroma MV of a chroma PB that is associated with the luma PB can be derived from the luma MV.

In related video coding technologies, the fractional MV precision is up to a quarter-pel precision, such as ½ and ¼, and 16 bits are used to represent x and y components of a MV. However, when a targeted video resolution is increased, or the fractional MV precision is increased, the MV range constraint, such as $[-2^{15}, 2^{15}-1]$ having $2^{16}$ integer MV values, in the related video coding technologies may not be adequate. There is a need to design appropriate MV range constraints to support new video coding technologies.

For a MV range having a fractional MV precision of $2^{-N}$, the MV range can specify a MV more accurately when N increases. For example, a first MV range having a fractional MV precision of 1/16 (i.e., N is 4) of a sample size in a current block can represent a MV more accurately than a second MV range having a fractional MV precision of ¼ (i.e., N is 2). Therefore, according to aspects of the disclosure, the fractional MV precision can be increased to $2^{-N}$ of the sample size where N can be an integer larger than 2. For example, when N is 4, the fractional MV precision is 1/16 of the sample size and can be more accurate than ¼ of the sample size (i.e., N is 2).

In an embodiment, an integer MV range using the integer MV precision can be specified by (M+1) bits having the integer MV range of $[-2^M, 2^M-1]$. The integer MV range includes $2^{M+1}$ different integer MV values from $-2^M$ to $2^{M-1}$ with an increment of 1. Each of x and y components of a MV can be represented using the integer MV range. Further, each of the x and y components of the MV can be represented using the fractional MV precision of $2^{-N}$, and thus, is one of $2^{L+1}$ MV values where L is a positive integer and a sum of M and N. In various embodiments, each of the x and y components of the MV can be represented by (L+1) bits including L bits for magnitude and 1 bit for direction (or sign), and the $2^{L+1}$ MV values are within a MV range of $[-2^L, 2^L-1]$. The $2^{L+1}$ MV values range from $-2^L$ to $2^L-1$ with an increment of 1. L and N can be any suitable positive integers, for example, L can be larger than or equal to 17 and N is equal to 4. When the MV is derived from a temporal neighboring block of the current block, the derived MV can be scaled. According to aspects of the disclosure, each of x and y components of the scaled MV can be adjusted to be within the same MV range of $[-2^L, 2^L-1]$ and represented by (L+1) bits. For example, a component of the scaled MV can be clipped to be within the same MV range of $[-2^L, 2^L-1]$ when the component of the scaled MV is outside the MV range of $[-2^L, 2^L-1]$. Accordingly, the MV can be represented with a higher precision, such as 1/16 instead of 1/4 of the sample size, and thus, can be specified more accurately as compared with video coding technologies where the fractional MV precision is, for example, 1/4 or 1/2. Further, when L is larger than or equal to 17, the MV range, such as represented by $[-2^L, 2^L-1]$, is larger than MV ranges of other video coding technologies where L is 16 or less. Therefore, the video coding technologies of the present disclosure are more advantageous, such as in specifying MVs having a higher video resolution and a more accurate MV precision.

As described above, a current block in a bi-directional predicted slice can be coded in one of a plurality of inter prediction directions: a forward uni-directional prediction associated with a first MV and a first reference picture, a backward uni-directional prediction associated with a second MV and a second reference picture, and a bi-directional prediction associated with the first and second MVs and the first and second reference pictures. In an example, the current block is coded with the bi-directional prediction, and motion information of the current block can include the first MV and the second MV, a first reference index, a second reference index, and an indicator for the bi-directional prediction. The first reference index can indicate the first reference picture in a first reference list 0 associated with the first MV. The second reference index can indicate the second reference picture in a second reference list 1 associated with the second MV. In an example, the current block is coded with the forward uni-directional prediction, and the motion information of the current block can include the first MV, the first reference index, and the indicator for the forward uni-directional prediction. In an example, the current block is coded with the backward uni-directional prediction, and the motion information of the current block can include the second MV, the second reference index, and the indicator for the backward uni-directional prediction.

Therefore, according to an embodiment of the disclosure, to store the motion information of the current block in a memory space, for example, in an encoder or a decoder, a size of the memory space can be at least J bits where the memory space is reserved for the first MV and the second MV, the first reference index and the second reference index. Each of x and y components of the first and second MVs can be represented by (L+1) bits and is in the MV range of $[-2^L, 2^L-1]$, as described above. The first reference index can be represented by K bits. The second reference index can be represented by K bits. In some embodiments, the indicator is represented by 2 bits, the memory space is also reserved for the indicator, and thus, J is equal to (4(L+1)+2K+2) bits. Alternatively, the indicator can be derived from the first or the second reference index. Therefore, J is equal to (4(L+1)+2K) bits.

In an embodiment, an integer MV range using the integer MV precision can be specified by (M+1) bits having the integer MV range of $[-2^M, 2^M-1]$. The integer MV range includes $2^{M+1}$ different integer MV values from $-2^M$ to $2^M-1$ with an increment of 1. On the other hand, a MV range of $[-2^L, 2^L-1]$ specified by (L+1) bits with the fractional MV precision includes $2^{L+1}$ different integer MV values from $-2^L$ to $2^L-1$ also with an increment of 1. A same MV, when represented by the integer MV range and the fractional MV range, respectively, can have two different MV values, i.e., a first MV value and a second MV value from the integer MV range and the fractional MV range, respectively. In some examples, because the MV range with the fractional MV precision has a higher precision (or resolution) than that of the integer MV range, the second MV value can represent the MV more accurately than the first MV value. For the fractional MV precision of $2^{-N}$, the MV range having $2^{L+1}$ MV values with the fractional MV precision of $2^{-N}$ corresponds to the integer MV range having $2^{M+1}$ MV values where $2^N$ of the $2^{L+1}$ MV values correspond to one of the $2^{M+1}$ MV values, and M is equal to (L−N).

In various embodiments, the MV range constraints described above can be implemented similarly as those described with reference to Eqs. (1)-(4) to obtain the first and/or second MV. When L bits are used to represent a magnitude of a MV component, x components of the first MV and the second MV can be obtained using Eqs. (14)-(15) as follows:

$$uLX[0]=(mvpLX[0]+mvdLX[0]2^{(L+1)})\% \ 2^{(L+1)} \quad (14)$$

$$mvLX[0]=(uLX[0]>=2^L)?(uLX[0]2^{(L+1)}):uLX[0] \quad (15)$$

where mvLX refers to the first MV when X is 0, and mvLX refers to the second MV when X is 1, and the MV range is $[-2^L, 2^L-1]$ specified by (L+1) bits including 1 bit for direction. Similarly, y components of the first MV and the second MV can be obtained using Eqs. (16)-(17) as follows:

$$uLX[1]=(mvpLX[1]+mvdLX[1]2^{(L+1)})\% \ 2^{(L+1)} \quad (16)$$

$$mvLX[1]=(uLX[1]>=2^L)?(uLX[1]2^{(L+0)}):uLX[1] \quad (17)$$

The x and y components of the first MV and the second MV as derived above using Eqs. (14)-(17) can be one of the $2^{(L+1)}$ MV values in the MV range.

According to an embodiment of the disclosure, when an MV, such as the first MV or the second MV, is coded with an AMVP mode, x and y components of the MV can be determined based on corresponding x and y components of a MV predictor and a MVD associated with the MV, respectively, for example, as described above with reference to Eqs. (14) and (16). When the MV is coded with the merge mode, the MVD can be zero and does not need to be transmitted. For example, the x component mvdLX[0] of the MVD in Eq. (14) and the y component mvdLX[1] of the MVD in Eq. (16) are zero. Accordingly, the x and y components of the MV can be determined based on x and y components of the MV predictor without the MVD.

As described above, when a MV predictor, such as the first MV or the second MV, is derived from a temporal candidate of the current block, the derived MV predictor can be scaled, for example, when reference pictures of the current block and the temporal candidate are not the same and are short-term reference pictures. Further, x and y components of the scaled MV can be further adjusted to be within the same MV range of $[-2^L, 2^L-1]$, similar to those described with reference to Eqs. (9)-(13). Eq. (18) shows an example of adjusting the scaled MV (i.e., scaled mvLXA) to be within the MV range of $[-2^L, 2^L-1]$. For example, a component of the scaled MV can be clipped to be within the MV range of $[-2^L, 2^L-1]$ when the component of the scaled MV is outside the MV range of $[-2^L, 2^L-1]$.

$$mvLXA=\text{Clip3}(-2^{-L},2^L-1,\text{scaled } mvLXA) \quad (18)$$

In various embodiments, more than 17 bits can be used to specify a MV, and corresponds to L being larger than 16. In an embodiment, 18 bits can be used to specify a component of the MV, such as the first or the second MV, with the fractional MV precision of $2^{-4}$ where M is 13, N is 4, and L is 17. Accordingly, the MV range is $[-2^{17}, 2^{17}-1]$ and includes $2^{18}$ integer MV values from $-2^{17}$ to $2^{17}-1$ with an increment of 1. For the integer MV precision of one sample size, the corresponding integer MV range is $[-2^{13}, 2^{13}-1]$ and includes $2^{14}$ integer MV values from $-2^{13}$ to $2^{13}-1$ with an increment of 1. 16 MV values in the MV range correspond to one MV value in the integer MV range. Each of x and y components of the MV can be obtained using Eqs. (14)-(18) by setting L to 17 in Eqs. (14)-(18). The resultant x and y components of the MV are in the MV range of $[-2^{17}, 2^{17}-1]$, thus satisfying the MV range constraint.

In an embodiment, 19 bits can be used to specify a component of the MV with the fractional MV precision of $2^{-4}$ where M is 14, N is 4, and L is 18. Accordingly, the MV range is $[-2^{18}, 2^{18}-1]$ and includes $2^{19}$ integer MV values from $-2^{18}$ to $2^{18}-1$ with an increment of 1. For the integer MV precision of one sample size, the corresponding integer MV range is $[-2^{14}, 2^{14}-1]$ and includes $2^{15}$ integer MV values from $-2^{14}$ to $2^{14}-1$ with an increment of 1. 16 MV values in the MV range correspond to one MV value in the integer MV range. Each of the x and y components of the MV can be obtained using Eqs. (14)-(18) by setting L to 18 in Eqs. (14)-(18). The resultant x and y components of the MV are in the MV range of $[-2^{18}, 2^{18}-1]$, thus satisfying the MV range constraint. In an example, K is 4, 2 bits are used to specify the indicator, and thus J is 86. In an example, K is 5, the indicator can be derived from the first and/or the second reference index, and thus J is 86.

In an embodiment, 20 bits can be used to specify a component of the MV with the fractional MV precision of $2^{-4}$ where M is 15, N is 4, and L is 19. Accordingly, the MV range is $[-2^{19}, 2^{19}-1]$ and includes $2^{20}$ integer MV values from $-2^{19}$ to $2^{19}-1$ with an increment of 1. For the integer MV precision of one sample size, the corresponding integer MV range is $[-2^{15}, 2^{15}-1]$ and includes $2^{16}$ integer MV values from $-2^{15}$ to $2^{15}-1$ with an increment of 1. 16 MV values in the MV range correspond to one MV value in the integer MV range. Each of the x and y components of the MV can be obtained using Eqs. (14)-(18) by setting L to 19 in Eqs. (14)-(18). The resultant x and y components of the MV are in the MV range of $[-2^{19}, 2^{19}-1]$, thus satisfying the MV range constraint. In an example, K is 4, 2 bits are used to specify the indicator, and thus J is 90.

In an embodiment, 23 bits can be used to specify a component of the MV with the fractional MV precision of $2^{-4}$ where M is 18, N is 4, and L is 22. Accordingly, the MV range is $[2^{22}, 2^{22}-1]$ and includes $2^{23}$ integer MV values from $-2^{22}$ to $2^{22}-1$ with an increment of 1. For the integer MV precision of one sample size, the corresponding integer MV range is $[-2^{18}, 2^{18}-1]$ and includes $2^{19}$ integer MV values from $-2^{18}$ to $2^{18}-1$ with an increment of 1. 16 MV values in the MV range correspond to one MV value in the integer MV range. Each of the x and y components of the MV can be obtained using Eqs. (14)-(18) by setting L to 22 in Eqs. (14)-(18). The resultant x and y components of the MV are in the MV range of $[2^{22}, 2^{22}-1]$, thus satisfying the MV range constraint. In an example, K is 4, 2 bits are used to specify the indicator, and thus J is 102. In an example, K is 5, the indicator can be derived from the first and/or the second reference index, and thus J is 102.

In an example, 24 bits can be used to specify a component of the MV with the fractional MV precision of $2^{-5}$ where M is 18, N is 5, and L is 23. Accordingly, the MV range is $[-2^{23}, 2^{23}-1]$ and includes $2^{24}$ integer MV values from $-2^{23}$ to $2^{23}-1$ with an increment of 1. For the integer MV precision of one sample size, the corresponding integer MV range is $[-2^{18}, 2^{18}-1]$ and includes $2^{19}$ integer MV values from $-2^{18}$ to $2^{18}-1$ with an increment of 1. 32 MV values in the MV range correspond to one MV value in the integer MV range. Each of the x and y components of the MV can be obtained using Eqs. (14)-(18) by setting L to 23 in Eqs. (14)-(18). The resultant x and y components of the MV are in the MV range of $[-2^{23}, 2^{23}-1]$, thus satisfying the MV range constraint. In an example, K is 4, 2 bits are used to specify the indicator, and J is 106 bits.

Figure 10:
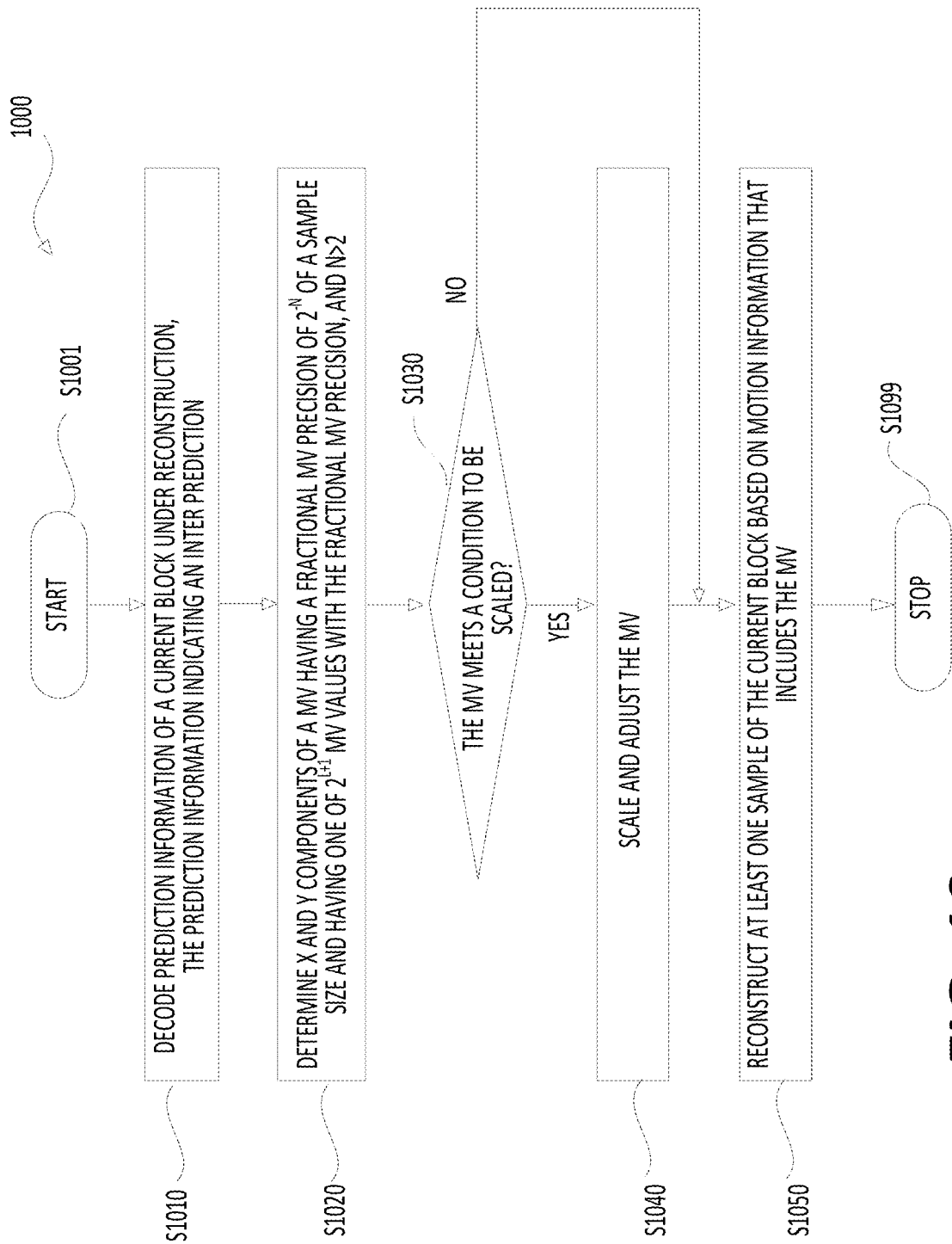
FIG. 10 shows a flow chart outlining a process (1000) according to an embodiment of the disclosure.

FIG. 10 shows a flow chart outlining a process (1000) according to an embodiment of the disclosure. The process (1000) can be used in the reconstruction of a current block coded in inter prediction, so to generate a prediction block for the current block under reconstruction. In various embodiments, the process (1000) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1000) is implemented in software instructions, thus when the processing circuitry executes the software instructions, the processing circuitry performs the process (1000). The process starts at (S1001) and proceeds to (S1010).

At (S1010), prediction information of the current block in a current picture is decoded from a coded video bitstream. The prediction information is indicative of the inter prediction. In an example, the prediction information further indicates (e.g., explicitly or implicitly) a merge mode, an AMVP mode, or the like, for the inter prediction. In an example, the prediction information further indicates an inter prediction direction as described above.

At (S1020), a MV for the current block is determined. The MV has a x component and a y component where each of the x and y components has a fractional MV precision that is $2^{-N}$ of a sample size in the current block and has one of $2^{L+1}$ MV values with the fractional MV precision. N is an integer larger than 2, and L is a positive integer. In an example, an MV range having the fractional MV precision for the MV is $[-2^L, 2^L-1]$. The MV range has $2^{L+1}$ integer MV values from $-2^L$ to $2^L-1$ with an increment of 1. Each component of the MV can be specified by (L+1) bits with 1 bit representing direction.

The MV can be determined from a spatial candidate or a temporal candidate from a respective reference picture list, e.g., L0 or L1, as described above. The MV can be determined in the merge mode without a MVD when the prediction information indicates the merge mode. Alternatively, the MV can be determined in the AMVP mode with a MVD associated with the MV when the prediction information indicates the AMVP mode.

At (S1030), whether the MV meets a condition to be scaled is determined. In an embodiment, whether the MV is derived from the temporal candidate is determined. When the MV is determined not to be derived from the temporal candidate, the process (1000) proceeds to (S1050). Otherwise, the MV is determined to be derived from the temporal candidate. Further, whether a reference picture of the current picture is different from a reference picture of the temporal candidate is determined. When the reference pictures are identical, the process (1000) proceeds to (S1050). Otherwise, whether the reference pictures are short-term reference pictures are determined, for example, based on temporal distances of the reference pictures from the current picture. When the reference pictures are short-term reference pictures, the process (1000) proceeds to (S1040). Otherwise, the process (1000) proceeds to (S1050).

At (S1040), each of x and y components of the MV can be scaled based on the temporal distances and further adjusted to be within a MV range constraint, such as the MV range, as described above, for example with reference to Eqs. (9)-(13) and (18).

At (S1050), at least one sample in the current block is reconstructed based on motion information that includes the MV. For example, if the inter prediction direction indicates a uni-directional prediction, such as the forward or the backward uni-directional prediction, the at least one sample in the current block is reconstructed based on the MV and the reference picture for the MV. Further, if the inter prediction direction indicates the bi-directional prediction, the motion information further includes another MV and a reference index of another reference picture. Accordingly, the at least one sample in the current block is reconstructed based on the MV, the reference picture for the MV, the other MV, and the reference picture of the other MV. Then the process (1000) proceeds to (S1099) and terminates.

Note that the process (1000) can be suitably adapted. For example, (S1020), (S1030), and (S1040) can be combined and any suitable order can be used to execute steps of the combined steps, (S1020), (S1030), and (S1040). In another example, at (S1010), the inter prediction direction is the bi-directional prediction. Accordingly, at (S1020), the MV and the other MV can be obtained. Certain steps can be suitably repeated, for example, the step (S1020) can be repeated to calculate the other MV.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
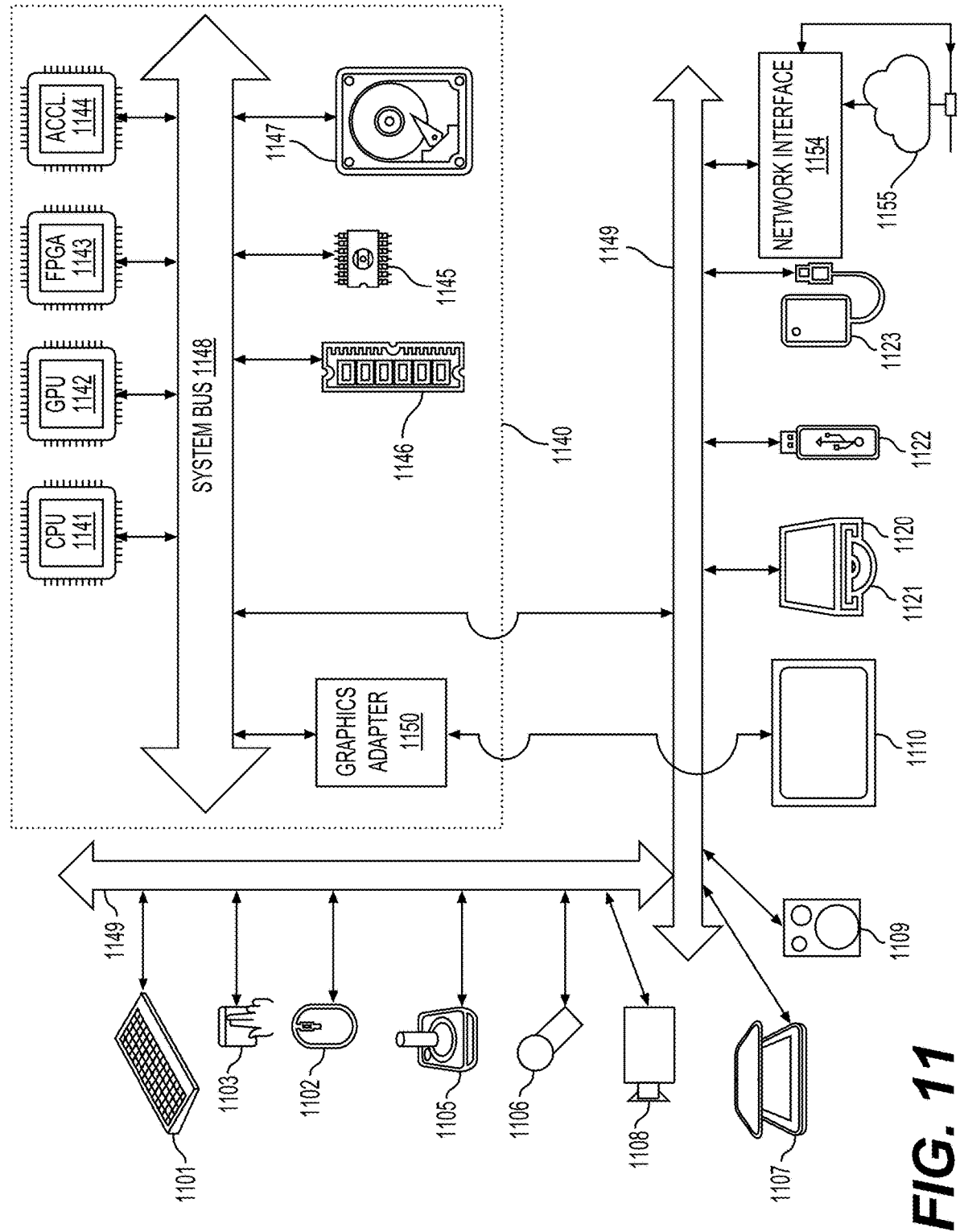
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
AMVP: Advanced Motion Vector Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding prediction information of a current block in a current picture from a coded video bitstream, the prediction information being indicative of inter prediction;
    determining, for the current block, motion information including a first motion vector (MV) that has a x component and a y component wherein each of the x and y components has a fractional MV precision that is $2^{-N}$ of a sample size in the current block and has one of $2^{L+1}$ MV values with the fractional MV precision, N being 4 and indicating the fractional MV precision, and a magnitude of the first MV being represented by L bits; and
    reconstructing at least one sample of the current block based on the motion information.

2. The method of claim 1, wherein each of the x and y components of the first MV is represented by (L+1) bits including L bits for magnitude and 1 bit for direction, and the $2^{L+1}$ MV values are within a fractional MV range of $[-2^L, 2^L-1]$.

3. The method of claim 2, further comprising:
storing the motion information in a memory space, a size of the memory space being at least J bits reserved for the first MV and a second MV, a first reference index, a second reference index, and an indicator for an inter prediction direction, wherein
each of x and y components of the second MV is represented by (L+1) bits,
the first reference index is represented by K bits and indicates a first reference picture in a first reference list associated with the first MV,
the second reference index is represented by K bits and indicates a second reference picture in a second reference list associated with the second MV,
the indicator is represented by I bits,
the inter prediction direction is one of: a forward uni-directional prediction associated with the first MV and the first reference picture, a backward uni-directional prediction associated with the second MV and the second reference picture, and a bi-directional prediction associated with the first and second MVs and the first and second reference pictures,
K is a positive integer,
I is one of: 0 and 2, and
J is equal to (4(L+1)+2K+I).

4. The method of claim 3, wherein L is 17, K is 4, I is 2, and J bits reserved for the memory space are 82, 18 bits being used for each of the x and y components of the first and second MVs.

5. The method of claim 3, wherein L, K, and I correspond to one of:
L is 18, K is 4, and I is 2;
L is 18, K is 5, and I is 0;
L is 19, K is 4, and I is 2;
L is 22, K is 4, and I is 2; and
L is 22, K is 5, and I is 0.

6. The method of claim 3, wherein the motion information further includes the second MV, the first reference index, the second reference index, and the indicator that indicates the bi-directional prediction.

7. The method of claim 2, wherein the determining the motion information further comprises:
determining the x and y components of the first MV based on corresponding x and y components of a MV predictor and a MV difference, respectively.

8. The method of claim 7, wherein
the prediction information indicates a merge mode for the inter prediction; and
the determining the x and y components of the first MV includes determining the x and y components based on the corresponding x and y components of the MV predictor without the MV difference.

9. The method of claim 2, wherein
the motion information further includes a first reference index indicating a first reference picture in a first reference list associated with the first MV; and
the determining the motion information further comprises:
obtaining an initial MV for the current block from a temporal candidate of the current block, a first temporal distance being between the first reference picture and the current picture, a second temporal distance being between a third reference picture of the temporal candidate and the current picture;
scaling, based on the first and second temporal distances, x and y components of the initial MV to obtain the x and y components of the first MV, respectively; and
for each of the x and y components of the first MV, when the respective component is outside the fractional MV range of $[-2^L, 2^L-1]$, clipping the respective component to be within the fractional MV range of $[-2^L, 2^L-1]$.

10. The method of claim 2, wherein an integer MV range having an integer MV precision is $[-2^M, 2^M-1]$ and corresponds to the fractional MV range, $2^N$ of the $2^{L+1}$ MV values in the fractional MV range correspond to one of $2^{M+1}$ MV values in the integer MV range, the integer MV precision is the sample size, and M is (L−N).

11. The method of claim 5, wherein 19 bits are used for each of the x and y components of the first and second MVs, 4 bits are used for each of the first and second reference indices, 2 bits are used for the indicator, and J bits reserved for the memory space are 86, L being 18, N being 4, K being 4, and I being 2.

12. An apparatus, comprising processing circuitry configured to:
decode prediction information of a current block in a current picture from a coded video bitstream, the prediction information being indicative of inter prediction;
determine, for the current block, motion information including a first motion vector (MV) that has a x component and a y component wherein each of the x and y components has a fractional MV precision that is $2^{-N}$ of a sample size in the current block and has one of $2^{L+1}$ MV values with the fractional MV precision, N being 4 and indicating the fractional MV precision, and a magnitude of the first MV being represented by L bits; and
reconstruct at least one sample of the current block based on the motion information.

13. The apparatus of claim 12, wherein each of the x and y components of the first MV is represented by (L+1) bits including L bits for magnitude and 1 bit for direction, and the $2^{L+1}$ MV values are within a fractional MV range of $[-2^L, 2^L-1]$.

14. The apparatus of claim 13, wherein the processing circuitry is configured to:
store the motion information in a memory space, a size of the memory space being at least J bits reserved for the first MV and a second MV, a first reference index, a second reference index, and an indicator for an inter prediction direction, wherein
each of x and y components of the second MV is represented by (L+1) bits,
the first reference index is represented by K bits and indicates a first reference picture in a first reference list associated with the first MV,
the second reference index is represented by K bits and indicates a second reference picture in a second reference list associated with the second MV,
the indicator is represented by I bits,
the inter prediction direction is one of: a forward uni-directional prediction associated with the first MV and the first reference picture, a backward uni-directional prediction associated with the second MV and the second reference picture, and a bi-directional prediction associated with the first and second MVs and the first and second reference pictures, K is a positive integer, I is one of: 0 and 2, and J is equal to (4(L+1)+2K+I).

15. The apparatus of claim 14, wherein L is 17, K is 4, I is 2, and J bits reserved for the memory space are 82, 18 bits being used for each of the x and y components of the first and second MVs.

16. The apparatus of claim 14, wherein L, K, and I correspond to one of:

L is 18, K is 4, and I is 2;

L is 18, K is 5, and I is 0;

L is 19, K is 4, and I is 2;

L is 22, K is 4, and I is 2; and

L is 22, K is 5, and I is 0.

17. The apparatus of claim 14, wherein the motion information further includes the second MV, the first reference index, the second reference index, and the indicator that indicates the bi-directional prediction.

18. The apparatus of claim 13, wherein the processing circuitry is configured to:

determine the x and y components of the first MV based on corresponding x and y components of a MV predictor and a MV difference, respectively.

19. The apparatus of claim 13, wherein the motion information further includes a first reference index indicating a first reference picture in a first reference list associated with the first MV; and the processing circuitry is configured to:

obtain an initial MV for the current block from a temporal candidate of the current block, a first temporal distance being between the first reference picture and the current picture, a second temporal distance being between a third reference picture of the temporal candidate and the current picture; and scale, based on the first and second temporal distances, x and y components of the initial MV to obtain the x and y components of the first MV, respectively; and for each of the x and y components of the first MV, when the respective component is outside the fractional MV range of $[-2^L, 2^L-1]$, clip the respective component to be within the fractional MV range of $[-2^L, 2^L-1]$.

20. A non-transitory computer-readable storage medium storing a program executable by at least one processor to perform:

decoding prediction information of a current block in a current picture from a coded video bitstream, the prediction information being indicative of inter prediction;

determining, for the current block, motion information including a first motion vector (MV) that has a x component and a y component wherein each of the x and y components has a fractional MV precision that is $2^{-N}$ of a sample size in the current block and has one of $2^{L+1}$ MV values with the fractional MV precision, N being 4 and indicating the fractional MV precision, and a magnitude of the first MV being represented by L bits; and reconstructing at least one sample of the current block based on the motion information.

* * * * *